(12) United States Patent
Nishizawa et al.

(10) Patent No.: US 8,596,246 B2
(45) Date of Patent: Dec. 3, 2013

(54) FUEL RAIL FOR HIGH-PRESSURE DIRECT-INJECTION INTERNAL COMBUSTION ENGINES AND METHOD FOR MANUFACTURING THEREOF

(75) Inventors: Hiroyuki Nishizawa, Shizuoka (JP); Haruo Nishihara, Shizuoka (JP); Shoichiro Usui, Shizuoka (JP); Koichi Hayashi, Shizuoka (JP); Hikari Tsuchiya, Shizuoka (JP)

(73) Assignee: Usui Kokusai Sangyo Kaisha Limited (JP)

( * ) Notice: Subject to any disclaimer, the term of this patent is extended or adjusted under 35 U.S.C. 154(b) by 348 days.

(21) Appl. No.: 13/000,658

(22) PCT Filed: Jun. 25, 2009

(86) PCT No.: PCT/JP2009/061635
§ 371 (c)(1),
(2), (4) Date: Dec. 22, 2010

(87) PCT Pub. No.: WO2010/001810
PCT Pub. Date: Jan. 7, 2010

(65) Prior Publication Data
US 2011/0108005 A1  May 12, 2011

(30) Foreign Application Priority Data

Jun. 30, 2008  (JP) ................................. 2008-171660

(51) Int. Cl.
*F02M 55/02* (2006.01)
(52) U.S. Cl.
USPC .......................................... 123/469; 228/160

(58) Field of Classification Search
USPC ............ 123/456, 468, 469, 470; 29/890.043, 29/890.053, 890.126, 890.129, 890.131; 228/159, 160, 262.31, 262.42, 262.45
See application file for complete search history.

(56) References Cited

U.S. PATENT DOCUMENTS

| | | | |
|---|---|---|---|
| 4,631,171 A * | 12/1986 | McDonald et al. | 420/481 |
| 4,684,052 A * | 8/1987 | McDonald et al. | 228/122.1 |
| 6,126,208 A * | 10/2000 | Asada et al. | 285/133.4 |
| 6,213,095 B1 | 4/2001 | Asada et al. | |
| 6,317,975 B1 * | 11/2001 | Asada et al. | 29/888.01 |
| 6,397,881 B1 * | 6/2002 | Asada et al. | 137/318 |
| 6,889,660 B2 | 5/2005 | Usui et al. | |
| 7,114,489 B2 * | 10/2006 | Wenke et al. | 123/456 |

(Continued)

FOREIGN PATENT DOCUMENTS

| | | |
|---|---|---|
| JP | 58-065970 | 4/1983 |
| JP | 05-332221 | 12/1993 |

(Continued)

*Primary Examiner* — Hai Huynh
(74) *Attorney, Agent, or Firm* — Gerald E. Hespos; Michael J. Porco; Matthew T. Hespos (57) ABSTRACT

A fuel rail for high-pressure direct-injection internal combustion engines has an injector holder and a fastening bracket directly attached to a main body of the fuel rail. Thermal deformation may occur at the time of temporary fitting or brazing when assembling the rail. However, positional accuracy of the injector holder can be assured, which results in having an excellent sealing property. Components of the fuel rail for direct-injection internal combustion engines are made of steel or stainless steel, and the components are joined reciprocally by brazing. The components joined by brazing are finished by cutting work and/or burnishing processing after the brazing step.

9 Claims, 9 Drawing Sheets

(56) References Cited

U.S. PATENT DOCUMENTS

| | | | |
|---|---|---|---|
| 7,275,521 B2 * | 10/2007 | Usui et al. | 123/468 |
| 7,318,418 B2 * | 1/2008 | Usui et al. | 123/468 |
| 7,516,735 B1 * | 4/2009 | Doherty et al. | 123/468 |
| 7,699,041 B2 * | 4/2010 | Colletti et al. | 123/456 |
| 2008/0169364 A1 * | 7/2008 | Zdroik et al. | 239/533.2 |
| 2009/0144959 A1 * | 6/2009 | Colletti et al. | 29/428 |
| 2009/0179421 A1 * | 7/2009 | Stieler et al. | 285/148.19 |
| 2012/0138020 A1 * | 6/2012 | Kweon et al. | 123/469 |

FOREIGN PATENT DOCUMENTS

| | | |
|---|---|---|
| JP | 08-86261 | 4/1996 |
| JP | 10-110883 | 4/1998 |
| JP | 10-318084 | 12/1998 |
| JP | 2001-82663 | 3/2001 |
| JP | 3166090 | 3/2001 |
| JP | 2003-106238 | 4/2003 |
| JP | 2003-129920 | 5/2003 |
| JP | 2003-34387 | 12/2003 |
| JP | 2005-69023 | 3/2005 |
| JP | 2006-336490 | 12/2006 |
| JP | 3885910 | 12/2006 |
| JP | 2007-16668 | 1/2007 |
| JP | 2007-309232 | 11/2007 |
| JP | 4032383 | 11/2007 |
| JP | 2010-7651 * | 1/2010 |

* cited by examiner

FUEL RAIL FOR HIGH-PRESSURE DIRECT-INJECTION INTERNAL COMBUSTION ENGINES AND METHOD FOR MANUFACTURING THEREOF

BACKGROUND OF THE INVENTION

1. Field of the Invention

The present invention relates to a fuel rail (a delivery pipe) for supplying high-pressure fuel, which is supplied from fuel booster pumps of such as electronic fuel injection-type automobile engines, through a fuel injector (an injection nozzle) directly injecting into an engine cylinder. More specifically, the present invention relates to a fuel rail for high-pressure direct-injection internal combustion engines using a compression-ignition method or a spark-ignition method in a type for directly supplying fuel from a rail to an injector, and the manufacturing method of the fuel rail.

2. Description of the Related Art

As a fuel rail for direct-injection internal-combustion engines, there is a fuel rail for the gasoline engines in which main fuel is gasoline, and a fuel rail for the diesel engines in which main fuel is light oil. For example, for a fuel rail for direct-injection gasoline engines, fuel rails as described in the Japanese patent No. 3166090, Japanese patent No. 3885910, Japanese patent No. 4032383 and Japanese Patent Laid-Open No. 2007-16668 are known. In Japanese patent No. 3166090, a fuel rail comprising a communicating pipe and several cylindrical sockets, wherein the cylindrical sockets are formed by mold forming so that punched grooves bored in the communicating pipe can be covered, and a fuel-feeding hole is formed by boring each of the punched grooves to communicate with the inside of the cylindrical sockets, is disclosed. In Japanese patent No. 3885910, a fuel rail comprising components such as a main rail, a fuel-feeding pipe and a socket, the components are assembled by brazing, and then plating is performed on the whole product and an inner peripheral face of the pipe, is disclosed. In Japanese patent No. 4032383, a fuel rail comprising a main pipe and several branch pipes, wherein through-holes for receiving each branch pipe are formed to an outer wall of the main pipe, each through-hole has an annular wall which projects towards the outside and inside of the main pipe respectively, and each branch pipe is fixed to the annular wall, is disclosed. In Japanese patent Laid-Open No. 2007-16668, a fuel rail comprising a main rail having an injector holder, wherein the main rail and the holder are reciprocally connected while the injector holder is inserted into through holes provided in a peripheral wall section of the main rail, is disclosed.

Alternatively, in the case of a fuel rail for high-pressure direct-injection gasoline engines, for example, as for the connection of a fuel injectors (an injection nozzle), due to its O-ring seal structure, there might be a fuel leakage in the case of high pressure if a positional accuracy and roughness of a sealing surface are bad. On this account, especially in a fuel rail for high-pressure direct-injection internal combustion engines, machining process was required to assure positional accuracy and assembly accuracy. In the past, for this kind of fuel rail for high-pressure direct-injection gasoline engines, for example, such as a fuel rail for direct-injection internal combustion engines in which a machining process is performed on aluminum casting or an extrusion die (cf. Japanese patent Laid-Open No. 58-65970), or a fuel rail for direct-injection internal combustion engines which is constructed by assembling stainless-steel components by brazing or welding (cf. Japanese patent Laid-Open No. 2003-129920), are known. Moreover, for example, for a fuel rail for direct-injection diesel engines, fuel rails as described in the Japanese patent Laid-Open No. 2005-69023, Japanese patent Laid-Open No. 10-110883 and Japanese patent Laid-Open No. 2003-343387 are known. In Japanese patent Laid-Open No. 2005-69023, a fuel rail in which through holes are provided in a peripheral wall section of a cylindrical container or a peripheral wall section of a spherical container, and the fuel rail being constructed by reciprocally-connected while diverging branch pipes or branch connection metal fittings are inserted into the through holes, is disclosed. In Japanese patent Laid-Open No. 10-110883, a fuel rail having a flow passage inside a shaft core, a main rail made by brazing short-length block elements having a boss section which is provided with through holes communicating with the flow passage, in which the diverging branch pipes or branch connection metal fittings are connected to the boss section, is disclosed. In Japanese patent Laid-Open No. 2003-343387, a fuel rail comprising a main rail having branch connection metal fittings, wherein the main rail and the metal fittings are reciprocally brazed while the metal fittings are inserted into through holes provided in a peripheral wall section of the main rail, is disclosed.

SUMMARY OF THE INVENTION

The above described conventional fuel rails for high-pressure direct-injection internal combustion engines made of aluminum or stainless steel, however, has problems as described below.

In the case of a fuel rail for direct-injection internal combustion engines made of aluminum, there are problems that it cannot be used for the diesel engine in which injection pressure reaches 150-250 MPa because its materials strength is low, and moreover, even if the fuel rail is for gasoline engines, the fuel rail has poor layout property because it is necessary to increase in wall-thickness of the rail so as to withstand high fuel pressure (injection pressure); and that a production cost goes up since it is necessary for its contact surface with fuel to be subjected to special surface treatment because the aluminum fuel rail is sensitive to alcohol and corrosive fuel. Alternatively, in the case of a fuel rail made of steel or stainless steel having high material strength, the fuel rail has the strength that can withstand a high fuel pressure (injection pressure). However, there are drawbacks in the fuel rail that positional accuracy at a connection of a fuel injector (injection nozzle) holder is bad which cause a fuel leakage problem, since the fuel rail is assembled by brazing, and moreover a position correction is difficult due to the high strength. Particularly in a fuel rail for diesel engines, it is totally impossible to correct a position since the wall thickness of the rail is thick and moreover, it might result in worsening of sealing property since the brazing filler metal may hang at a joint of a seal ring of the injector holder connection and then surface roughness of a sealing surface is degraded. In addition, in a fuel rail for direct-injection internal combustion engines, especially a fuel rail for gasoline engines, when the fuel rail is assembled by brazing, an injector holder and a rail installation boss section are offset and arranged at the same side to a fuel-feeding pipe since a line for the injector attaching portion and a line for fixing the rail come near. Therefore, the rail may be thermally deformed in tack/temporary weld at the time of assembling the rail, and moreover, weight inclines to one side of the rail at the time of brazing. Accordingly, there was a risk that the rail might similarly thermally-deformed.

The present invention has been made in consideration of the problems that the above described conventional fuel rail for high-pressure direct-injection internal combustion engines, especially, the present invention is directed to provide a high-quality fuel rail for high-pressure direct-injection internal combustion engines, and a method for manufacturing such a fuel rail at low cost. Such a high-quality fuel rail has a structure in which an injector holder, a branch nipple and a fastening bracket are directly attached to a main body of the rail, and has advantages that even if thermal deformation occurs at the time of temporary fitting or brazing when assembling the rail, positional accuracy of the injector holder and the branch nipple and surface roughness of a sealing surface can be assured by finish processing such as cutting work after the brazing, which results in having an excellent sealing property, and that the fuel rail has an excellent inclination accuracy or surface roughness of an abutting surface with a partner member of the fastening bracket, and a seating surface of a bolt or a nut.

The present invention relates to a fuel rail for high-pressure direct-injection internal combustion engines, in which components of the fuel rail for direct-injection internal combustion engines are made of steel or stainless steel, and the components are reciprocally joined by brazing, characterized in that the components joined by brazing are finished by cutting work and/or burnishing processing after the brazing step.

Moreover, in the fuel rail for high-pressure direct-injection internal combustion engines of the present invention, the components made of steel or stainless steel are comprised of an injector holder, a fastening bracket and a main rail, and the fuel rail has a structure that each of the injector holder and the fastening bracket become paired and joined to the main rail by brazing. Here, in a preferred embodiment of the invention, the injector holder and the fastening bracket in pairs are mounted on one side of the main rail so as to be eccentric to a shaft core of the main rail.

Further, in a preferred embodiment of the invention, when the components of the fuel rail for direct-injection internal combustion engines are made of steel, the components and at least a contact region with fuel between the components and the joined portion by brazing are coated with a plating film. Here, a chemical nickel plating film is preferable as the plating film.

Furthermore, in a preferred embodiment of the invention, at least a contact portion with fuel of the components, which is a portion of the components contacting with fuel, is coated with a chemical nickel plating film, and an outer surface of the components is coated with a zinc plating film or a zinc-nickel plating film.

Next, in the present invention, a method for manufacturing a fuel rail for high-pressure direct-injection internal combustion engines is comprised of the steps of:
reciprocally brazing components made of steel or stainless steel of the fuel rail, and
performing cutting work and/or burnishing process at least one part of the components of the fuel rail assembled by the above brazing step.

Here, the method for manufacturing the fuel rail is characterized in that a preliminary processing is performed on the components before the brazing step, and a finish processing is performed after the brazing step.

Moreover, in a preferred embodiment of the method for manufacturing the invention, in a fuel rail for direct-injection internal combustion engines made of steel or stainless steel, the fuel rail is comprised of components including a main rail, an injector holder and a fastening bracket made of steel or stainless steel, and the method has a step of joining the injector holder and the fastening bracket respectively in pairs to the main rail by brazing, and also the method has a step of mounting the injector holder and the fastening bracket in pairs on one side of the main rail so as to be eccentric to a shaft core of the main rail.

Furthermore, in a preferred embodiment of the method for manufacturing the invention, when the components of the fuel rail for direct-injection internal combustion engines are made of steel, the method has a step of coating at least a contact region with fuel between the components and the brazing joined portion with a plating film, and here, a chemical nickel plating film is preferable as the plating film.

Besides, in a preferred embodiment of the method for manufacturing the invention, the method is comprised of steps of firstly coating at least a contact portion with fuel of the components with a chemical nickel plating film, and secondly coating an outer surface of the components with a zinc plating film or a zinc-nickel plating film.

In addition, in the manufacturing method of the fuel rail for high-pressure direct-injection internal combustion engines of the present invention, a through hole leading to a flow passage of the main rail may be provided in advance in a peripheral wall section of the main rail, and further, the injector holder may be provided with a pilot hole in advance, and after assembled by brazing, the pilot hole may be machined. Moreover, the injector holder may be also machined after assembled by brazing without providing any pilot hole to the injector holder.

In the fuel rail for high-pressure direct-injection internal combustion engines related to the present invention, the components reciprocally joined by brazing are finished by performing cutting work and/or burnishing processing after brazing to be a product. Therefore, the fuel rail has beneficial effects that even for the fuel rail made of steel or stainless steel that is assembled by brazing and having high materials strength, positional accuracy and roughness of a sealing surface of connections of such as a fuel injector (injection nozzle) holder, a branch nipple for connecting injectors and a fastening bracket, are sufficiently assured;

sealing property of an O-ring seal structure or a seal structure for pressing an inclined surface is extremely high;

in the fastening bracket, positional accuracy and inclination accuracy of a hole for passing through a bolt, and inclination accuracy and surface roughness of an abutting seating surface with a partner member or a seating surface of a bolt/nut can be assured; and installation strength to an engine block or pressing strength to an injector (strength to prevent an injector from slightly stirring by being pushed by high pressure generated in a combustion chamber at the time of an explosion) can be improved. Moreover, when the components of the fuel rail for direct-injection internal combustion engines are made of steel, the components, the brazing joined portion thereof, and a contact region with the components and fuel are coated with a chemical nickel plating film, a zinc plating film, or a plating film such as zinc-nickel plating. As a result, the fuel rail offers heat-resistant and corrosion resistance.

Moreover, according to the method for manufacturing the present invention, even if thermal deformation occurs in the main rail at the time of temporary fitting or brazing of the components, positional accuracy and roughness of sealing surfaces of a fuel injector (injection nozzle) holder and the connection of a branch nipple for connecting the injector can be sufficiently assured without the need for a correction process or a reformation process of the main rail, because the product is finished by performing cutting work (including screw processing such as cutting and rolling) and/or burnishing processing after brazing of the components. Further, it is possible to provide a high-quality fuel rail for high-pressure direct-injection internal combustion engines, having extremely high sealing property of an O-ring seal structure or a seal structure for pressing an inclined surface at low cost.

Accordingly, the present invention contributes to quality improvement and reduction of a production cost of a highly-reliable fuel rail for high-pressure direct-injection internal combustion engines, the fuel rail is strong enough to withstand an injection pressure of between 150-250 MPa in a compression-ignition engine, and an injection pressure of between 10-40 MPa in a spark-ignition engine.

The invention, together with further advantages thereof, may be best be understood by reference to the following description taken in conjunction with the accompanying drawings.

DETAILED DESCRIPTION OF THE PREFERRED EMBODIMENTS

Figure 1:
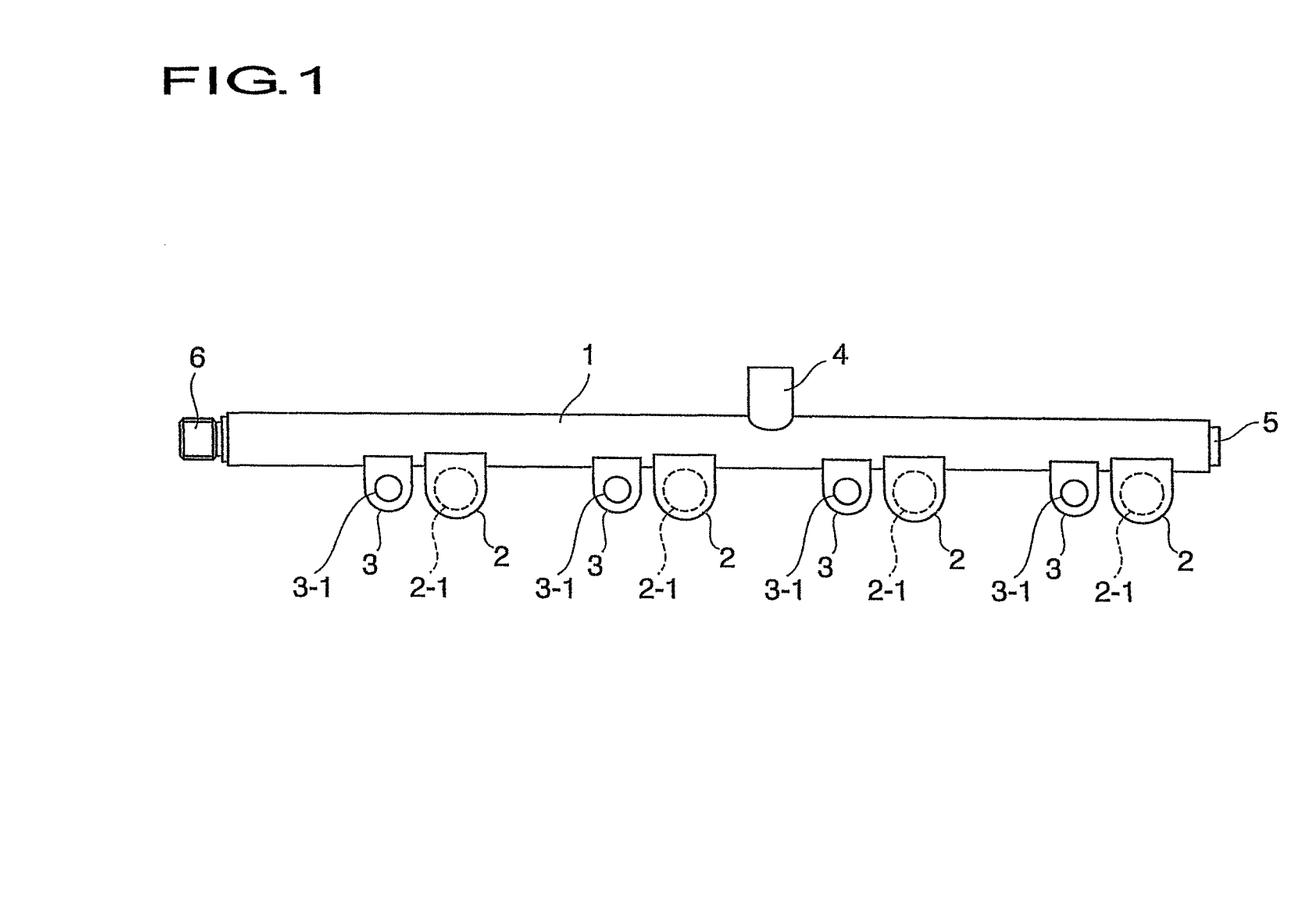
FIG. 1 is a plane view showing one embodiment of a fuel rail for high-pressure direct-injection internal combustion engines of a spark-ignition type according to the present invention.
Figure 2:
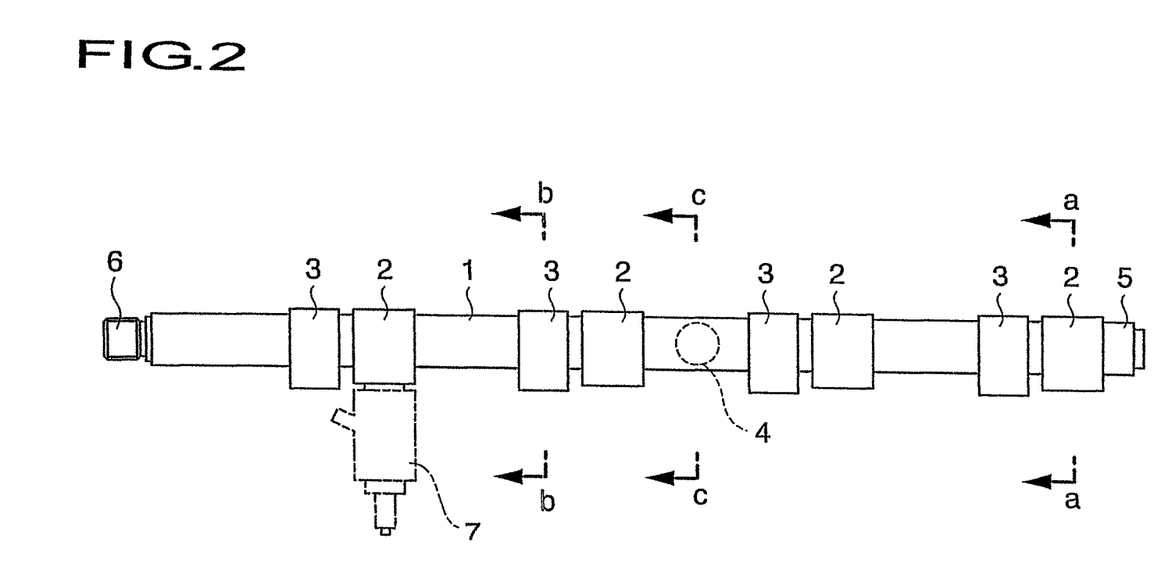
FIG. 2 is a front view of the fuel rail for high-pressure direct-injection internal combustion engines of a spark-ignition type according to the present invention.
Figure 3A:
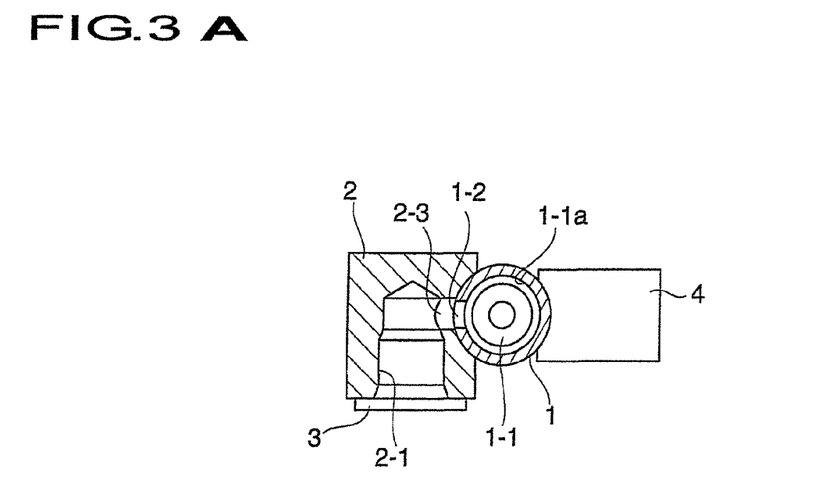
FIG. 3A is a cross sectional view of each part of the fuel rail for high-pressure direct-injection internal combustion engines of a spark-ignition type according to the present invention, in particular, an enlarged cross-sectional view cut along an a-a line on FIG. 2.
Figure 3B:
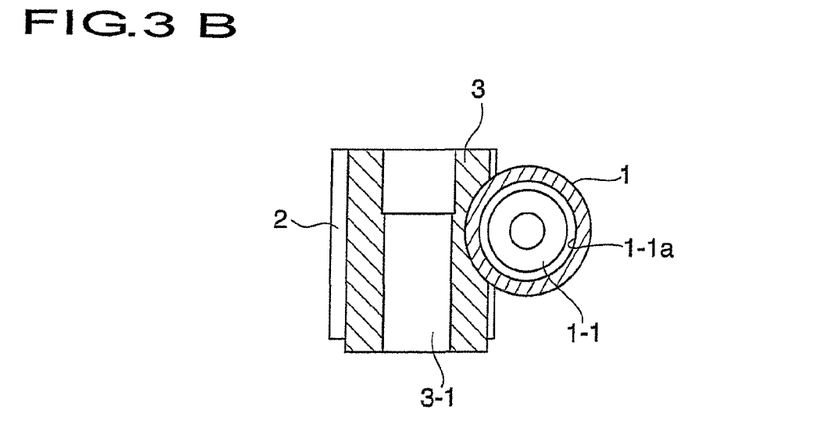
FIG. 3B is a cross sectional view of each part of the fuel rail for high-pressure direct-injection internal combustion engines of a spark-ignition type according to the present invention, in particular, an enlarged cross-sectional view cut along a b-b line on FIG. 2.
Figure 3C:
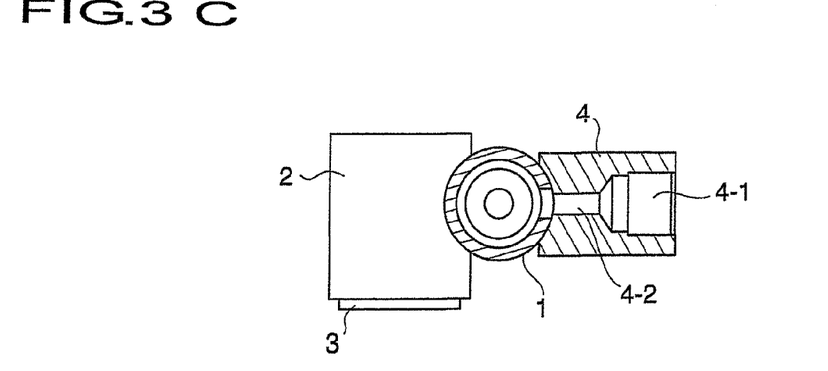
FIG. 3C is a cross sectional view of each part of the fuel rail for high-pressure direct-injection internal combustion engines of a spark-ignition type according to the present invention, in particular, an enlarged cross-sectional view cut along a c-c line on FIG. 2.
Figure 4:
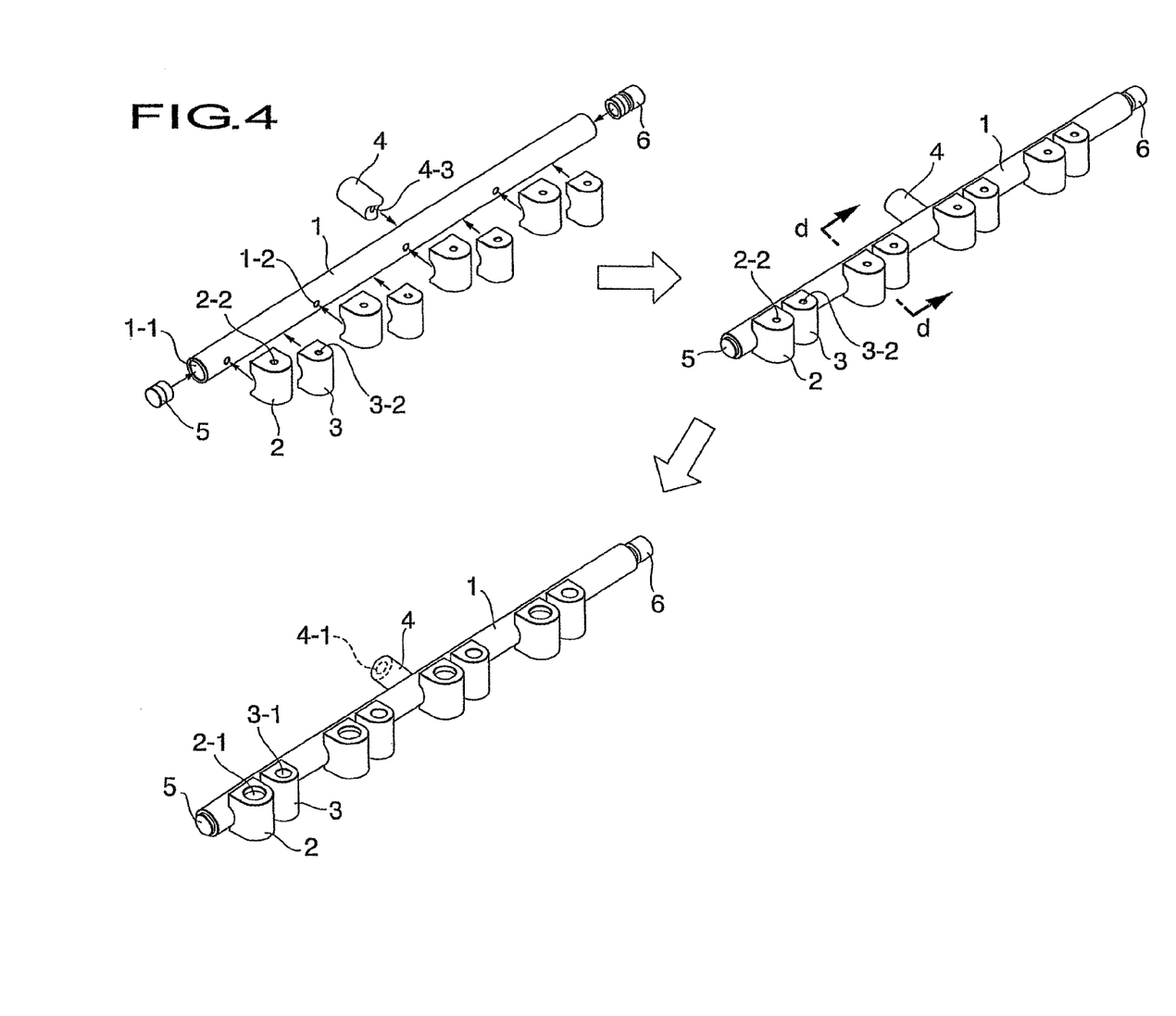
FIG. 4 is a process chart schematically showing one embodiment of the method for manufacturing the fuel rail for high-pressure direct-injection internal combustion engines of spark-ignition type according to the present invention.
Figure 5:
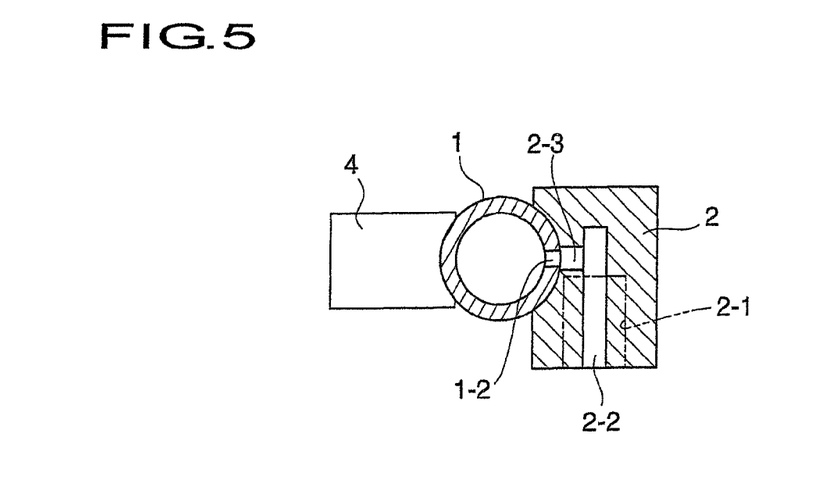
FIG. 5 is an enlarged cross-sectional view cut along an d-d line on FIG. 4.
Figure 6:
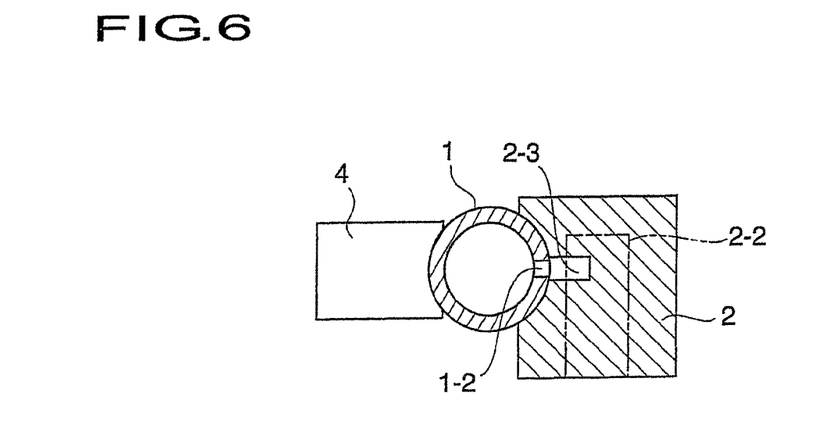
FIG. 6 is an enlarged cross-sectional view being equivalent to FIG. 5 showing other embodiment of the method for manufacturing the fuel rail shown in FIG. 4.
Figure 7:
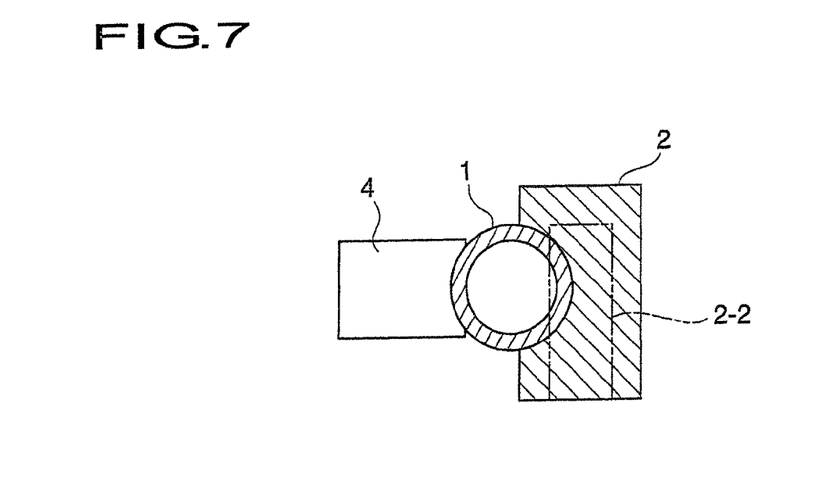
FIG. 7 is also an enlarged cross-sectional view being equivalent to FIG. 5 showing other embodiment of the method for manufacturing the fuel rail shown in FIG. 4.
Figure 8:
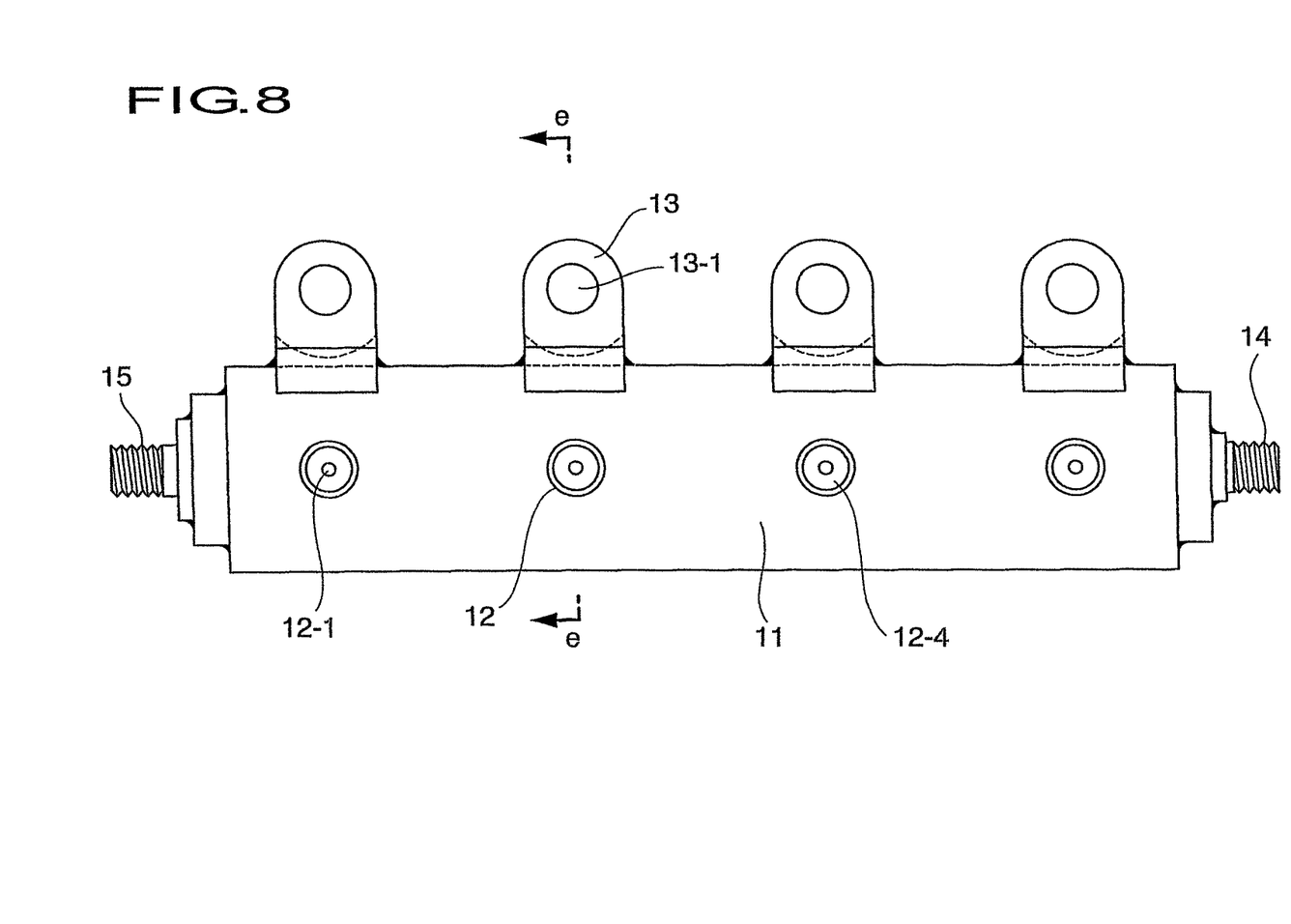
FIG. 8 is a plane view showing other embodiment of the fuel rail for high-pressure direct-injection internal combustion engines of a compression-ignition type, according to the present invention.
Figure 9:
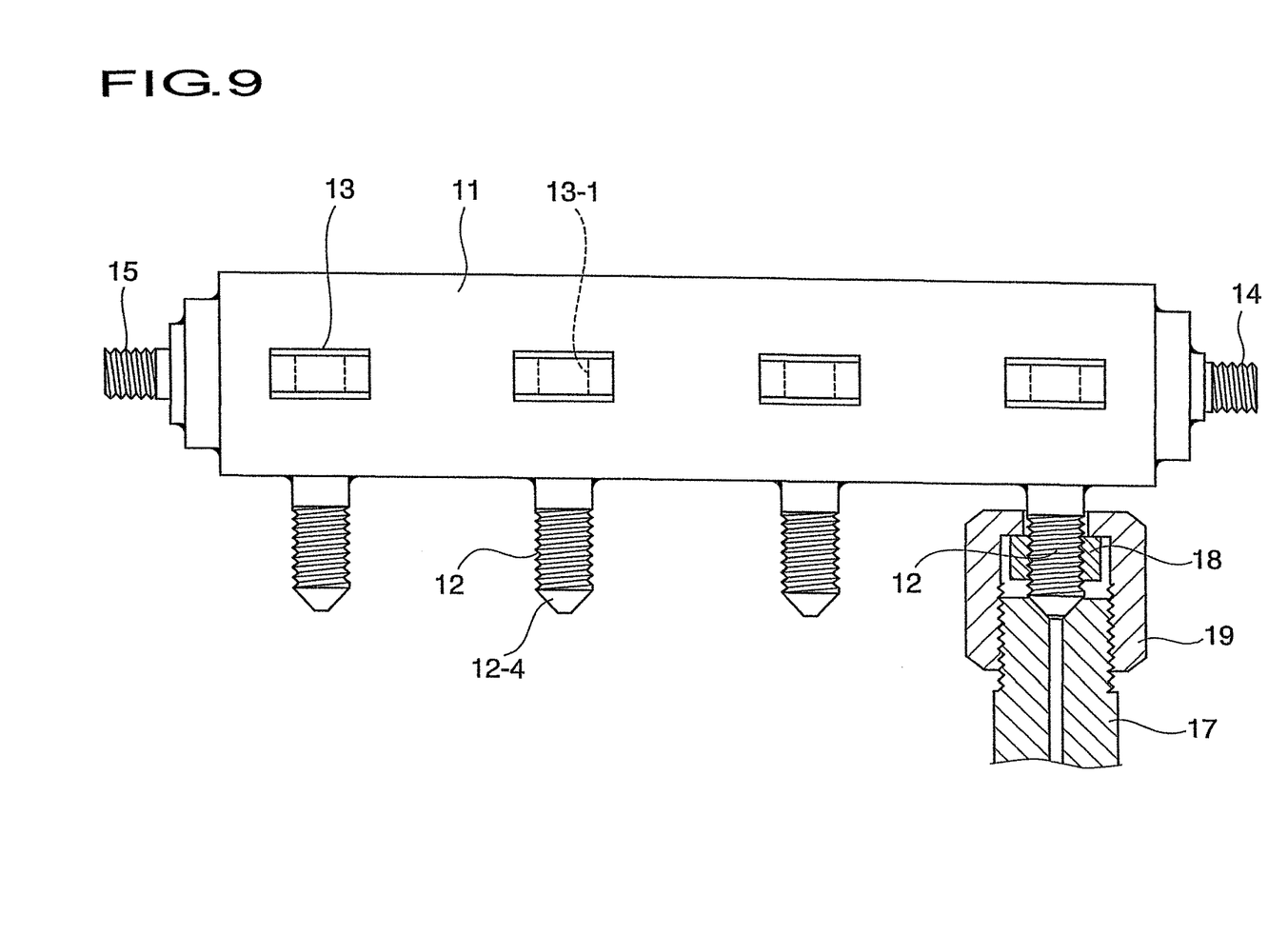
FIG. 9 is a front view showing the above embodiment of the fuel rail for high-pressure direct-injection internal combustion engines of a compression-ignition type according to the present invention.
Figure 10:
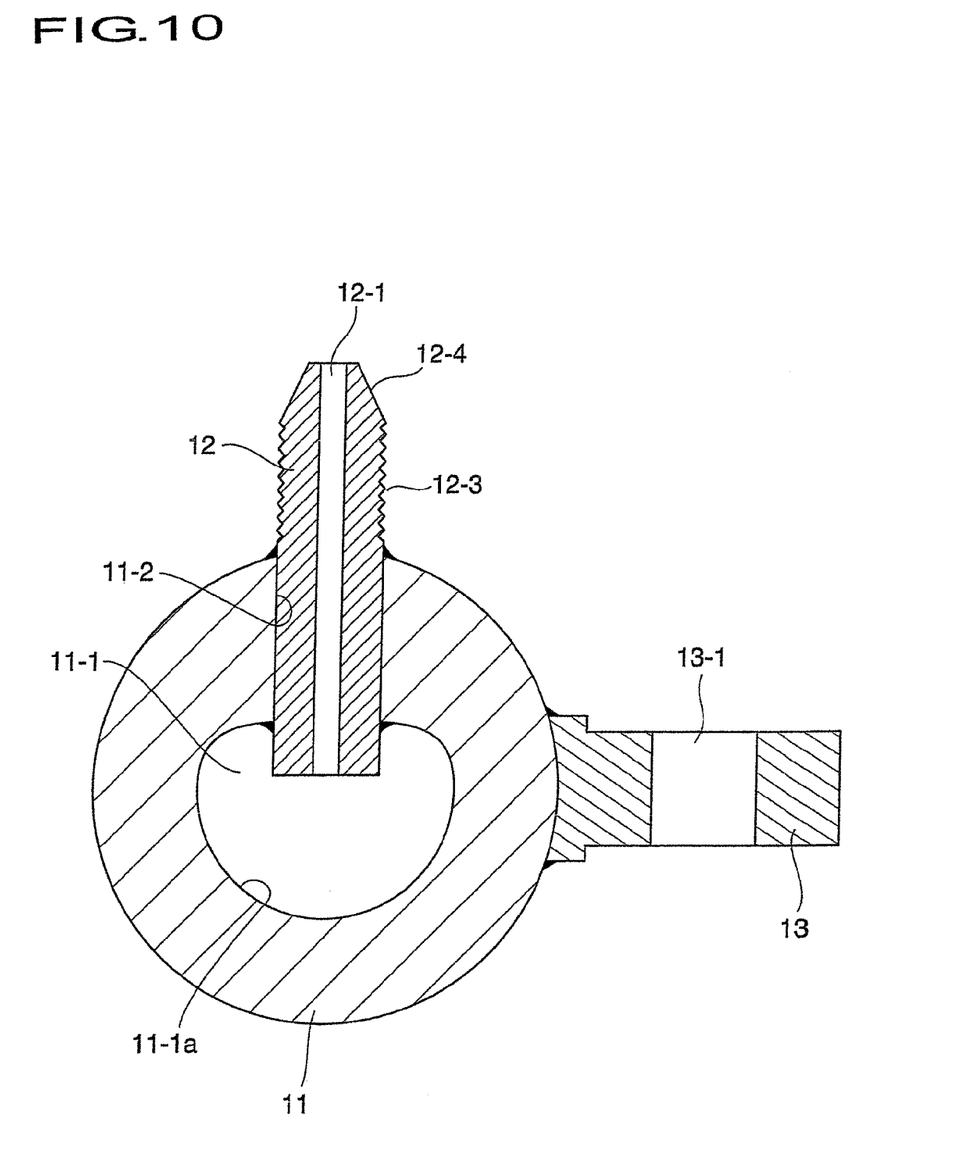
FIG. 10 is an enlarged cross-sectional view cut along an e-e line on FIG. 8.
Figure 11:
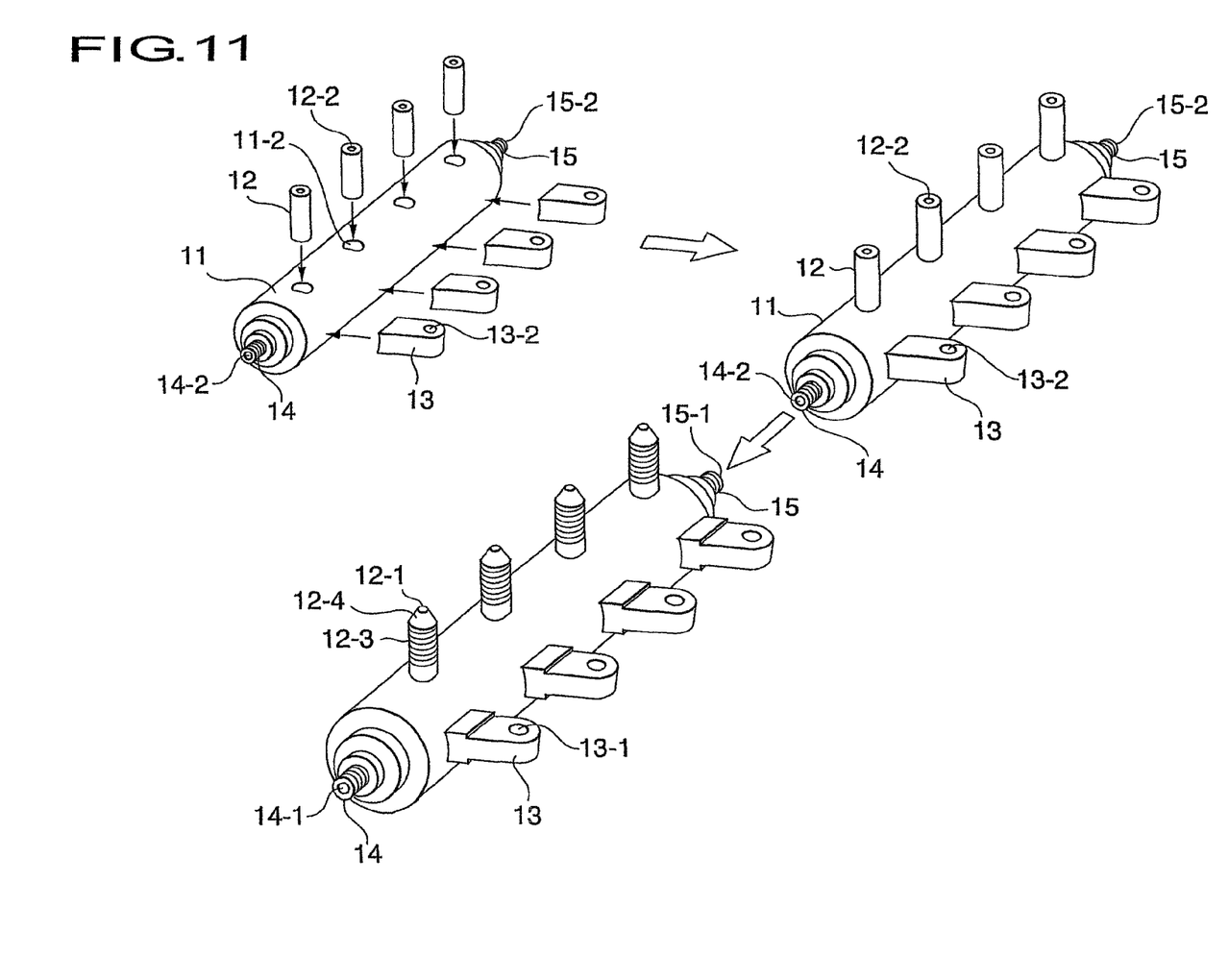
FIG. 11 is a process chart schematically showing one embodiment of the method for manufacturing the fuel rail for high-pressure direct-injection internal combustion engines of compression-ignition type according to the present invention.

FIG. 1 is a plane view showing one embodiment of a fuel rail for high-pressure direct-injection internal combustion engines of a spark-ignition type according to the present invention; FIG. 2 is a front view of the fuel rail for high-pressure direct-injection internal combustion engines of a spark-ignition type according to the present invention; FIG. 3A is a cross sectional view of each part of the fuel rail for high-pressure direct-injection internal combustion engines of a spark-ignition type according to the present invention, in particular, an enlarged cross-sectional view cut along an a-a line on FIG. 2; FIG. 3B is a cross sectional view of each part of the fuel rail for high-pressure direct-injection internal combustion engines of a spark-ignition type according to the present invention, in particular, an enlarged cross-sectional view cut along a b-b line on FIG. 2; FIG. 3C is a cross sectional view of each part of the fuel rail for high-pressure direct-injection internal combustion engines of a spark-ignition type according to the present invention, in particular, an enlarged cross-sectional view cut along a c-c line on FIG. 2; FIG. 4 is a process chart schematically showing one embodiment of the method for manufacturing the fuel rail for high-pressure direct-injection internal combustion engines of spark-ignition type according to the present invention; FIG. 5 is an enlarged cross-sectional view cut along an d-d line on FIG. 4; FIG. 6 is an enlarged cross-sectional view being equivalent to FIG. 5 showing other embodiment of the method for manufacturing the fuel rail shown in FIG. 4; FIG. 7 is also an enlarged cross-sectional view being equivalent to FIG. 5 showing other embodiment of the method for manufacturing the fuel rail shown in FIG. 4; FIG. 8 is a plane view showing other embodiment of the fuel rail for high-pressure direct-injection internal combustion engines of a compression-ignition type, according to the present invention; FIG. 9 is a front view showing the above embodiment of the fuel rail for high-pressure direct-injection internal combustion engines of a compression-ignition type according to the present invention; FIG. 10 is an enlarged cross-sectional view cut along an e-e line on FIG. 8; and FIG. 11 is a process chart schematically showing one embodiment of the method for manufacturing the fuel rail for high-pressure direct-injection internal combustion engines of compression-ignition type according to the present invention. In this embodiment, 1 and 11 designate a main rail; 1-1 and 11-1 designate a flow passage; 1-1a and 11-1a designate an inner circumference wall surface; 1-2 and 11-2 designate a through hole; 2 designates an injector holder; 2-1 designates a finish processed hole; 2-2 designates a pilot [prepared] hole; 2-3 designates a lateral hole; 3 and 13 designates a fastening bracket; 4 designates a boss for a pressure sensor; 5 designates a plug; 6 designates an inlet connector; 7 and 17 designate an injector; 12 designates a branch nipple for connecting injectors; 14 designates a pressure sensor nipple; 15 designates an inlet nipple; 18 designates a screw sleeve; and 19 designates a cap nut.

In addition, here, the present invention is explained in greater detail below, taking the following two kinds of fuel rails as examples, one of which is a fuel rail for high-pressure direct-injection internal combustion engines having a spark-ignition type, in which four injector holders and fastening brackets which are paired therewith are mounted on one side of the main rail being eccentric to a shaft core of the main rail; and the other is a fuel rail for high-pressure direct-injection internal combustion engines of a compression-ignition type, in which four branch nipples are mounted along a shaft core of a main rail, and fastening brackets being paired with the branch nipples are mounted on one side of the main rail being eccentric to the shaft core of the main rail.

In the present invention, a main rail 1, 11 is a main body of a fuel rail for high-pressure direct-injection internal combustion engines, and a fuel inlet pipe (not shown) is connected to one end or a wall surface of the main rail through an inlet connector 6 and an inlet nipple 15. This fuel inlet pipe is connected to a high-pressure fuel pump (not shown), and is connected to a fuel tank (not shown) containing a low-pressure fuel pump through a pipe (not shown). Fuel of this fuel tank is transferred to the fuel inlet pipe through the pipe and the high-pressure fuel pump, and flows from the fuel inlet pipe to the main rail 1, 11 through the inlet connector 6, the inlet nipple 15, and then is injected into a cylinder (not shown) from an injector 7, 17.

A main rail 1 in a fuel rail for high-pressure direct-injection internal combustion engines shown in FIG. 1 is a steel tube made of steel or stainless steel, having a pipe diameter in the order of Φ15 to Φ30 mm and having a thickness in the order of 1.5 to 2.5 mm. The main rail 1 is provided with a plurality of injector holders 2 made of steel or stainless steel, the injector holders allowing an injector 7 to connect to a peripheral wall section of the main rail 1. For example, when a four-cylinder engine is used, the main rail is provided with four injector holders 2 at desired intervals, and when a straight-six engine is used, the main rail is provided with six injector holders 2 at desired intervals. In addition, each injector holder 2 is paired with a fastening bracket 3 made of steel or stainless steel so as to firmly fix the holder, and the paired holders and fastening brackets are arranged to the main rail 1.

A fuel rail for high-pressure direct-injection internal combustion engines of a spark-ignition type shown in FIG. 1 has a structure in which four injector holders 2 are joined by brazing to through holes 1-2 formed on a peripheral wall section in an axial direction of the main rail 1, the rail having a cylindrical inner peripheral wall surface 1-1a, the inside of the rail being a flow passage 1-1. Each of the injector holders 2 is paired with a fastening bracket 3, and the paired holders and fastening brackets are arranged to the main rail 1. Further, a boss 4 for a pressure sensor is joined to a wall surface of the main rail 1 by brazing, and a plug 5 and an inlet connector 6 are joined to pipe ends of the main rail 1 by brazing. In this fuel rail for direct-injection internal combustion engines shown in FIG. 1, all the components such as the main rail 1, the injector holders 2, the fastening brackets 3 and the boss 4 for a pressure sensor, are finished by cutting work after brazing.

In addition, when all the components of this fuel rail for high-pressure direct-injection internal combustion engines are made of steel, it is preferable to coat the components and at least a contact region with fuel between the components and the brazing joined portion with a plating film. In that case, a chemical nickel-plating film is preferable as the plating film. Furthermore, at least a contact portion with fuel of the components can be coated with a chemical nickel plating film, and subsequently an outer surface of the components can be coated with a zinc plating film having chromate film/layer or a zinc-nickel plating film.

In FIG. 3A, a cross sectional view of a part of an injector holder 2 is shown. In this FIG. 3A, the injector holder 2 provided with a finish-processed hole 2-1 and a lateral hole 2-3 by cutting work is joined to a part of a through hole 1-2 formed in a peripheral wall section in an axial direction of the main rail 1 by brazing reciprocally with the main rail 1. In addition, burnishing processing may be further performed on the finish-processed hole 2-1 which is a sealing surface with an injector built-in seal ring (not shown). FIG. 3B is a cross-sectional view of a part of the fastening bracket 3, and the fastening bracket 3 in which a finish-processed hole 3-1 is formed by drill processing, is joined to the main rail 1 reciprocally by brazing. In addition, a bearing surface and an abutting surface with a mate member such as engine block (not shown), and a bearing surface with a bolt or nut for attachment (both not shown), may be subjected to cutting work by milling or end milling. FIG. 3C is a cross-sectional view of a part of boss 4 for a pressure sensor, and the boss 4 for a pressure sensor provided with a finish processed hole 4-1 and an interconnecting port 4-2 by cutting work with such as drills, is joined to a part of a through hole 1-3 (*1-2?) formed in a peripheral wall section of the main rail 1 by brazing at a predetermined angle reciprocally with the main rail 1. Furthermore, the finish processed hole 4-1, which is a sealing surface with a pressure sensor built-in seal ring (not shown), may be subjected to a burnishing processing if necessary. In addition, each joined surface of the injector holder 2, the fastening bracket 3 and the boss 4 for a pressure sensor, which is joined to the main rail 1, is formed in advance into a concavity (a saddle shape) having a circular-arc cross section so as to go along an outer peripheral surface of the main rail 1.

Next, one embodiment of the method for manufacturing a fuel rail for high-pressure direct-injection internal combustion engines having a spark-ignition type claimed in the present invention will be explained based on the accompanying FIG. 4 and FIG. 5.

On the occasion of manufacturing the fuel rail for high-pressure direct-injection internal combustion engines, in which a main rail 1 is provided with a plurality of through holes 1-2, 4 through holes here, formed in advance on a peripheral wall section in an axial direction of a pipe body of the main rail made of steel or stainless steel and having a cylindrical inner peripheral wall surface 1-1a, the inside of the rail being a flow passage 1-1, at first, in a brazing process, an injector holder 2 previously provided with a pilot hole 2-2 and a lateral hole 2-3 (see FIG. 5), a fastening bracket 3 previously provided with a pilot hole 3-2, and a boss 4 for a pressure sensor previously provided with a pilot hole 4-3, are temporary fitted and brazed to the main rail 1, respectively. On this occasion, four sets of the injector holder 2 and the fastening bracket 3 are prepared in accordance with the number of the through holes, here, four through holes 1-2, the holes formed on a peripheral wall section of the main rail 1 respectively. Then, the injector holders 2 are arranged to correspond to the through hole 1-2 and the fastening brackets 3 are arranged so that each of them becomes paired with each of the injector holders 2. The injector holders 2 and fastening brackets 3 and the boss 4 for a pressure sensor are then subjected to tack weld respectively. In such a state, the injector holders 2, fastening brackets 3 and the boss 4 for a pressure sensor are joined to the main rail 1 by brazing respectively to construct the fuel rail. In this regard, the brazing operations are carried out with copper brazing filler metal or nickel brazing filler metal, in a nonoxidizing atmosphere furnace if the fuel rail is made of steel, or in a hydrogen furnace or a vacuum furnace if the fuel rail is made of stainless steel.

Then, in a cutting work process, the injector holders 2, the fastening brackets 3 and the boss 4 for a pressure sensor of the fuel rail for high-pressure direct-injection internal combustion engines which was assembled in the above brazing process are finish-processed by performing a cutting work, further by burnishing processing if necessary. For example, in a case of the injector holders 2, as shown in FIG. 5, a part of the previously provided pilot hole 2-2 is processed by cutting work using a drill or a reamer to form a finish processed hole 2-1. As for the fastening bracket 3 and the boss 4 for a pressure sensor, part of each of the pilot holes 3-2, 4-3 is processed by such as a drill, an end mill or a reamer to form a finish processed hole 3-1, 4-1, just as in the case of the injector holders 2.

In addition, in the present invention, as other embodiment of the method of the present invention is shown in FIG. 6, the injector holder 2 is assembled and brazed with only a lateral hole 2-3 provided, without providing a pilot hole 2-2. Subsequently, at first, in a cutting work process, the pilot hole is drilled and then processed by a reamer, and subsequently can be finish-processed by a burnishing processing to form a finish processed hole 2-1. Further, as other embodiment of the method of the present invention is shown in FIG. 7, the injector holder 2 is assembled and brazed without providing a pilot hole 2-2 and a lateral hole 2-3. Subsequently, in a cutting work process, a finish processed hole 2-1 and a main rail 1 are simultaneously subjected to a cutting work and burnishing process, and then a finish processed hole 2-1 of the injector holder 2 and a flow passage 1-1 of the main rail 1 may be communicated each other.

As discussed above, in the method for manufacturing a fuel rail for direct-injection internal combustion engines having a spark-ignition type claimed in the present invention, even if thermal deformation occurs in the main rail at the time of temporary fitting or brazing of each components of the fuel rail, positional and inclination accuracies and roughness of sealing surfaces of a connection of a fuel injector holder can be sufficiently assured without the need for a correction process or a reformation process of the main rail, because each of the components made of steel or stainless steel of the fuel rail is finished by performing cutting work and/or burnishing processing after brazing and assembling the components.

In addition, in the method for manufacturing the fuel rail of the present invention, when components such as a main rail 1, injector holders 2, fastening brackets 3 and a boss 4 for a pressure sensor are made of steel, it is possible to further enhance heat resistance and corrosion resistance by coating the components and at least a contact region with fuel between the components and the brazing joined portion with a plating film, and by coating an outer surface of the components with a zinc plating having chromate layer or a zinc-nickel plating also having chromate layer after coating at least a contact portion with fuel of the components with a chemical nickel plating.

Next, a fuel rail for high-pressure direct-injection internal combustion engines having a compression-ignition type shown in FIG. 8-FIG. 10 is described below.

A fuel rail for high-pressure direct-injection internal combustion engines having a compression ignition method shown in FIG. 8 to FIG. 10 has a structure in which connecting end portions of four branch nipples 12 for connecting injectors, each of branch nipples is made of steel or stainless steel and having a flow passage 12-1 in its shaft core, are deeply inserted to through holes 11-2 so that each tip section of the end portions on the side of the flow passage 12-1 can be projected from a cylindrical inner peripheral wall surface 11-1a of the main rail 11 into a flow passage 11-1, the through holes formed on an inner peripheral wall section, preferably on a flat section in an axial direction of the main rail 11, the rail 11 made by a thick-walled steel pipe material made of such as carbon steel or stainless steel having the cylindrical inner peripheral wall surface 11-1a and a pipe diameter less than about 40 mm, the inside of the rail being the flow passage 11-1. Then, with the tip section of the end portions projected from the cylindrical inner peripheral wall surface 11-1a into the flow passage 11-1, the branch nipples 12 are temporarily fitted with through holes 11-2 of the main rail by brazing, subsequently, they are joined by brazing with brazing filler metal such as copper or nickel. Each of the branch nipples 12 for connecting injectors is paired with a fastening bracket 13 which is made of steel or stainless steel and has a finish-processed hole 13-1 for insertion of bolt, and the paired branch nipples and fastening brackets are joined to the main rail 11 by brazing. Further, a nipple 14 for a pressure sensor and an inlet nipple 15, both made of steel or stainless steel, are joined to the main rail 11 respectively by brazing. In this fuel rail for high-pressure direct-injection internal combustion engines of a compression ignition method shown in FIG. 8 to FIG. 10, the components such as the main rail 11, the branch nipple 12 for connecting injectors, the fastening bracket 13, the nipple 14 for a pressure sensor, the inlet nipple 15, and their brazing joined portions are all joined by brazing and then the parts, which were subjected to a processing of a pilot hole in advance, are subjected to a finish processing by cutting work and burnishing process, in the same procedure as in the method of manufacturing the fuel rail for high-pressure direct-injection internal combustion engines having a spark-ignition type shown in FIG. 4 to FIG. 5, as discussed below. At the same time, as for the branch nipple 12 for connecting injectors, a seat surface 12-4 with an injector 17 is subjected to a burnishing processing after cutting as necessary, and a threaded portion 12-3 is subjected to a cutting work by a screw processing. In addition, in the case of this fuel rail for high-pressure direct-injection internal combustion engines, a joined surface between the fastening bracket 13 and the main rail 11 is formed in advance into a concavity (a saddle shape) having a circular-arc cross section so as to go along an outer peripheral surface of the main rail 11.

Besides, in the case of this fuel rail for high-pressure direct-injection internal combustion engines, as shown in FIG. 9, a screw sleeve 18 and a cap nut 19 are embedded in each of the branch nipples 12 for connecting injectors and the branch nipple is directly engaged with an injector 17.

Next, the method for manufacturing a fuel rail for high-pressure direct-injection internal combustion engines having a compression ignition type as shown in FIG. 8 to FIG. 10 will be explained based on the accompanying FIG. 11. Just like the method for manufacturing the fuel rail for high-pressure direct-injection internal combustion engines having a spark-ignition type, at first, to a main rail 11 provided with a plurality of through holes 11-2, 4 through holes here, formed in advance on a peripheral wall section in an axial direction of a pipe body of the main rail made of steel or stainless steel and having a cylindrical inner peripheral wall surface 11-1a, the inside of the rail being a flow passage 11-1, in a brazing process, a branch nipple 12 for connecting injectors previously provided with a pilot hole 12-2, a fastening bracket 13 previously provided with a pilot hole 13-2, a nipple 14 for a pressure sensor and an inlet nipple 15 are temporary fitted and brazed, respectively. On this occasion, four sets of the branch nipple 12 for connecting injectors and the fastening bracket 13 are prepared in accordance with the number of the through holes, here, four through holes 11-2, the holes formed on a peripheral wall section of the main rail 11 respectively. Then, the branch nipples 12 for connecting injectors are arranged to correspond to the through hole 11-2 and the fastening brackets 13 are arranged so that each of them becomes paired with each of the branch nipples 12 for connecting injectors. The branch nipples 12 for connecting injectors, fastening brackets 13, the nipple 14 for a pressure sensor and the inlet nipple 15 are then subjected to tack weld respectively. In such a state, the branch nipples 12 for connecting injectors, fastening brackets 13, the nipple 14 for a pressure sensor and the inlet nipple 15 are joined to the main rail 11 by brazing respectively to construct the fuel rail. In this embodiment, like other embodiments, the brazing operations are carried out with copper brazing filler metal or nickel brazing filler metal, in a nonoxidizing atmosphere furnace if the fuel rail is made of steel, or in a hydrogen furnace or a vacuum furnace if the fuel rail is made of stainless steel.

Then, in a cutting work process, the branch nipple 12 for connecting injectors, the fastening brackets 13 and the nipple 14 for a pressure sensor and the inlet nipple 15 of the fuel rail for high-pressure direct-injection internal combustion engines having a compression ignition type which was assembled in the above brazing process, are finish-processed by performing a cutting work, further by burnishing processing as necessary. For example, in a case of the branch nipples 12 for connecting injectors, the seat surface 12-4 is subjected to cutting work and a part of the previously provided pilot hole 12-2 is processed by cutting work using a drill or a reamer to form a finish processed hole 12-1. The seat surface 12-4 is subjected to burnishing processing as necessary. As for the fastening bracket 13, the nipple 14 for a pressure sensor and the inlet nipple 15, part of each of the pilot holes 13-2, 14-2, 15-2 is processed by such as a drill, an end mill or a reamer to form a finish processed hole 13-1, 14-1, 15-1, just as in the case of the branch nipple 12 for connecting injectors.

In addition, in the method for manufacturing the fuel rail for high-pressure direct-injection internal combustion engines having a spark-ignition type and a compression ignition type, when transformation in brazing is minimal or when the flow of brazing filler metal to essential parts can be prevented, it is a matter of course that part of the processes/processing may be omitted.

Furthermore, in the same manner as above, when all the components of this fuel rail for high-pressure direct-injection internal combustion engines having a compression ignition type are made of steel, it is preferable to coat the components and at least a contact region with fuel between the components and the brazing joined portion with a plating film. Further, in that case, a chemical nickel plating film is preferable for the plating film, further of the component first of all chemistry nickel plating is at least performed on a contact portion with fuel, it goes without saying zinc plating film having the class of black mates or that it is the same, and zinc-nickel plating having the class of black mates can be performed to an exterior surface of the component then subsequently. In that case, a chemical nickel-plating film is preferable as the plating film. Moreover, it is a matter of course that at least a contact portion with fuel of the components can be coated with a chemical nickel plating film, and subsequently an outer surface of the components can be coated with a zinc plating film having chromate film/layer or a zinc-nickel plating film.

As discussed above, in the method for manufacturing the fuel rail for direct-injection internal combustion engines having a compression ignition type claimed in the present invention, as in the case of the method for manufacturing the fuel rail for direct-injection internal combustion engines having a spark-ignition type, even if thermal deformation occurs in the main rail at the time of temporary fitting or brazing of each components of the fuel rail, positional and inclination accuracies and roughness of sealing surfaces of a connection of a fuel injector holder can be sufficiently assured without the need for a correction process or a reformation process of the main rail, because each of the components made of steel or stainless steel of the fuel rail is finished by performing cutting work and/or burnishing processing after brazing and assembling the components.

In the fuel rail for high-pressure direct-injection internal combustion engines having a spark-ignition type and a compression ignition type related to the present invention, the components joined by brazing are finished by performing cutting work and/or burnishing processing after brazing to be a product. Therefore, the fuel rail has beneficial effects that

- even for the fuel rail made of steel or stainless steel that is assembled by brazing and having high materials strength, positional accuracy and roughness of a sealing surface of connections of such as a fuel injector (injection nozzle) holder, a branch nipple for connecting injectors and a fastening bracket, are sufficiently assured;
- sealing property of an O-ring seal structure or a seal structure for pressing an inclined surface is extremely high;
- in the fastening bracket, positional accuracy and inclination accuracy of a hole for passing through a bolt, and inclination accuracy and surface roughness of an abutting seating surface with a partner member or a seating surface of a bolt/nut can be assured; and
- installation strength to an engine block or pressing strength to an injector can be improved.

Moreover, when the components of the fuel rail for direct-injection internal combustion engines are made of steel, the components, the brazing joined portion thereof, and a contact region with the components and fuel are coated with a chemical nickel plating film, a zinc plating film, or a plating film such as zinc-nickel plating. As a result, the fuel rail offers heat-resistant and corrosion resistance.

Moreover, according to the method for manufacturing the present invention, even if thermal deformation occurs in the main rail at the time of temporary fitting or brazing of the components, positional accuracy and roughness of sealing surfaces of a fuel injector (injection nozzle) holder and the connection of a branch nipple for connecting the injector can be sufficiently assured without the need for a correction process or a reformation process of the main rail, because the product is finished by performing cutting work (including screw processing) and/or burnishing processing after brazing of the components. Further, it is possible to provide a high-quality fuel rail for high-pressure direct-injection internal combustion engines, having extremely high sealing property of an O-ring seal structure or a seal structure for pressing an inclined surface at low cost. Accordingly, the present invention contributes to quality improvement and reduction of a production cost of a highly-reliable fuel rail for high-pressure direct-injection internal combustion engines, the fuel rail is strong enough to withstand an injection pressure of between 150-250 MPa in a compression-ignition engine, and an injection pressure of between 10-40 MPa in a spark-ignition engine.

What is claimed is:

1. A method for manufacturing a fuel rail for high-pressure direct-injection internal combustion engines, comprising the steps of:
    providing a main rail made of steel or stainless steel having a flow passage therein and through holes communicating with the flow passage,
    providing injector connecting structures made of steel or stainless steel,
    reciprocally brazing the injector connecting structures and the main rail so that the injector connecting structures substantially align with the through holes, and
    performing cutting work to the injector connecting structures that have been brazed to the main rail to form finish processed holes that communicate respectively with the through holes in the main rail, and burnishing the injector connecting structures of the fuel rail that have been assembled to the main rail by brazing.

2. The method for manufacturing a fuel rail for high-pressure direct-injection internal combustion engines according to claim 1, wherein a preliminary processing is performed on the injector connecting structures before brazing, and a finish processing is performed after brazing.

3. The method for manufacturing a fuel rail for high-pressure direct-injection internal combustion engines according to claim 2, wherein the method is comprised of steps of firstly coating at least a contact portion with fuel of the components with a chemical nickel plating film, and secondly coating an outer surface of the components with a zinc plating film or a zinc-nickel plating film.

4. The method for manufacturing a fuel rail for high-pressure direct-injection internal combustion engines according to claim 1, wherein the injector connecting structure are injector holders and wherein the method further comprises brazing fastening brackets made of steel or stainless steel to the main rail so that the injector holders and the fastening brackets are disposed in pairs on the main rail and performing cutting work to the fastening brackets that have been brazed to the main rail to form finish processed holes.

5. The method for manufacturing a fuel rail for high-pressure direct-injection internal combustion engines according to claim 4, wherein the injector holders and the fastening brackets are brazed in pairs on one side of the main rail so as to be eccentric to a shaft core of the main rail.

6. The method for manufacturing a fuel rail for high-pressure direct-injection internal combustion engines according to claim 1, wherein when the components of the fuel rail for direct-injection internal combustion engines are made of steel, and the method further comprising coating at least a contact region with fuel between the injector connecting structures and the main rail with a plating film.

7. The method for manufacturing a fuel rail for high-pressure direct-injection internal combustion engines according to claim 6, wherein the plating film is a chemical nickel plating film.

8. The method for manufacturing a fuel rail for high-pressure direct-injection internal combustion engines according to claim 1, wherein the step of providing injector connecting structures made of steel or stainless steel comprises providing injector connecting structures with no holes formed therein and wherein the step of performing cutting work to the injector connecting structures comprises forming the finish processed holes.

9. The method for manufacturing a fuel rail for high-pressure direct-injection internal combustion engines according to claim 1, wherein the step of providing injector connecting structures made of steel or stainless steel comprises providing injector connecting structures with at least one pilot hole therein and wherein the step of performing cutting work to the injector connecting structures comprises forming the finish processed holes at the pilot hole.

\* \* \* \* \*